US006801782B2

(12) United States Patent
McCrady et al.

(10) Patent No.: US 6,801,782 B2
(45) Date of Patent: Oct. 5, 2004

(54) METHOD AND APPARATUS FOR DETERMINING THE POSITION OF A MOBILE COMMUNICATION DEVICE

(75) Inventors: Dennis D. McCrady, Holmdel, NJ (US); Peter Cummiskey, Clark, NJ (US); Lawrence J. Doyle, Hazlet, NJ (US); Howard Forstrom, Fairlawn, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 632 days.

(21) Appl. No.: 09/777,625

(22) Filed: Feb. 6, 2001

(65) Prior Publication Data

US 2001/0053699 A1 Dec. 20, 2001

Related U.S. Application Data

(63) Continuation-in-part of application No. 09/365,702, filed on Aug. 2, 1999.

(51) Int. Cl.[7] .............................................. H04Q 7/00
(52) U.S. Cl. ..................... 455/517; 455/506; 455/65; 455/277.2; 455/456.1; 455/457; 375/347; 342/457.1
(58) Field of Search ........................... 455/456.1–456.6, 455/457, 517, 466, 67.1, 65; 342/457.1; 375/138, 347

(56) References Cited

U.S. PATENT DOCUMENTS

| | | |
|---|---|---|
| 4,042,926 A | 8/1977 | Anderson et al. |
| 4,665,404 A | 5/1987 | Christy et al. |
| 4,742,357 A | 5/1988 | Rackley |
| 4,910,521 A | 3/1990 | Mellon |
| RE34,004 E | 7/1992 | Rogoff et al. |
| 5,293,642 A | 3/1994 | Lo |
| 5,424,747 A | 6/1995 | Chazelas et al. |
| 5,579,321 A | 11/1996 | Van Grinsven et al. |
| 5,663,990 A | 9/1997 | Bolgiano et al. |
| 5,774,876 A | 6/1998 | Woolley et al. |
| 5,912,644 A | 6/1999 | Wang |
| 5,982,324 A | 11/1999 | Watters et al. |
| 6,453,168 B1 * | 9/2002 | McCrady et al. ..... 455/456.6 X |

OTHER PUBLICATIONS

Robert A. Scholtz, The Origins of Spread–Spectrum Communications, IEEE Transactions on Communications, May 1982, pp. 822–854, vol. Com. 30, No. 5, University of Southern California, Los Angeles, CA.

Benjamin B. Peterson, et al., Spread Spectrum Indoor Geolocation, Journal of the Institute of Navigation, Summer 1998, vol. 45, No. 2, New London, Connecticut.

* cited by examiner

*Primary Examiner*—Nay Maung
*Assistant Examiner*—Philip J. Sobutka
(74) *Attorney, Agent, or Firm*—Edell, Shapiro & Finnan, LLC

(57) ABSTRACT

A position location communication system determines the position of a mobile master radio using a round-trip messaging scheme in which the time of arrive (TOA) of ranging signals is accurately determined to yield the range estimates required to calculate the position of the mobile radio. The master radio transmits ranging signals to plural reference radios which respond by transmitting reply ranging signals. Upon reception of the reply ranging signal, the master radio determines the range to the reference radio from the signal propagation time. Any combination of fixed or mobile radios having known positions can be used as the reference radios for another mobile radio in the system. Individual radios do not need to be synchronized to a common time reference, thereby eliminating the need for highly accurate system clocks. Errors in TOA estimates are minimized by performing internal delay calibration, Doppler compensation, leading-edge-of-the-signal curve fitting and frequency diversity techniques.

43 Claims, 7 Drawing Sheets

METHOD AND APPARATUS FOR DETERMINING THE POSITION OF A MOBILE COMMUNICATION DEVICE

CROSS REFERENCE TO RELATED APPLICATION

This is a continuation-in-part of co-pending U.S. patent application Ser. No. 09/365,702, entitled "Method And Apparatus For Determining The Position of a Mobile Communication Device Using Low Accuracy Clocks," filed Aug. 2, 1999, the disclosure of which is incorporated herein by reference in its entirety.

BACKGROUND OF THE INVENTION

1. Field of the Invention

The present invention relates to a position location system for determining the position of a mobile communication device, and, more particularly, to a system employing two-way transmission of spread spectrum ranging signals between the mobile communication device and reference communication devices having relatively low accuracy clocks, to rapidly and accurately determine the position of the mobile communication device in the presence of severe multipath interference.

2. Description of the Related Art

The capability to rapidly and accurately determine the physical location of a mobile communication device would be of great benefit in a variety of applications. In a military context, it is desirable to know the location of military personnel and/or equipment during coordination of field operations and rescue missions, including scenarios where signals of conventional position-determining systems, such as global position system (GPS) signals, may not be available (e.g., within a building). More generally, appropriately equipped mobile communication devices could be used to track the position of personnel and resources located both indoors or outdoors, including but not limited to: police engaged in tactical operations; firefighters located near or within a burning building; medical personnel and equipment in a medical facility or en route to an emergency scene, including doctors, nurses, paramedics and ambulances; and personnel involved in search and rescue operations. An integrated position location communication device would also allow high-value items to be tracked and located, including such items as personal computers, laptop computers, portable electronic devices, luggage, briefcases, valuable inventory, and stolen automobiles. In urban environments, where conventional position determining systems have more difficulty operating, it would be desirable to reliably track fleets of commercial or industrial vehicles, including trucks, buses and rental vehicles. Tracking of people carrying a mobile communication device is also desirable in a number of contexts, including, but not limited to: children in a crowded environment such as a mall, amusement park or tourist attraction; location of personnel within a building; and location of prisoners in a detention facility.

The capability to determine the position of a mobile communication device also has application in locating the position of cellular telephones. Unlike conventional land-based/wire-connected telephones, the location of conventional cellular telephones cannot automatically be determined by emergency response systems (e.g., the 911 system in the United States) when an emergency call is placed. Thus, assistance cannot be provided if the caller is unable to speak to communicate his or her location (e.g., when the caller is unconscious, choking or detained against will). The capability to determine the position of cellular telephones could be used to pinpoint the location from which an emergency call has been made. Such information could also be used to assist in cell network management (for example, by factoring each mobile communication device's location into message routing algorithms).

Naturally, in cases where a mobile communication device is being used primarily to transmit or receive voice or data information, it would be desirable to incorporate position location capabilities such that the device can communicate and establish position location at the same time without disruption of the voice or data communication.

Among conventional techniques employed to determine the position of a mobile communication device is the reception at the mobile communication device of multiple timing signals respectively transmitted from multiple transmitters at different, known locations (e.g., global positioning system (GPS) satellites or ground-based transmitters). By determining the range to each transmitter from the arrival time of the timing signals, the mobile communication device can compute its position using trilateration.

The accuracy and operability of such position location techniques can be severely degraded in the presence of multipath interference caused by a signal traveling from a transmitter to the receiver along plural different paths, including a direct path and multiple, longer paths over which the signal is reflected off objects or other signal-reflective media. Unfortunately, multipath interference can be most severe in some of the very environments in which position location techniques would have their greatest usefulness, such as in urban environments and/or inside buildings, since artificial structures create opportunities for signals to be reflected, thereby causing signals to arrive at the receiver via a number of different paths.

Attempts have been made in position location systems to mitigate the effects of multipath interference. An example of a system reported to provide position location in a multipath environment is presented by Peterson et al. in "Spread Spectrum Indoor Geolocation," Navigation: Journal of The Institute of Navigation, Vol. 45, No 2, Summer 1998, incorporated herein by reference in its entirety. In the system described therein (hereinafter referred to as the Peterson system), the transmitter of a mobile radio continuously transmits a modulated pseudorandom noise (PRN) sequence, with a carrier frequency of 258.5 MHz and a chipping rate of 23.5 MHz. The transmitter is battery powered and therefore can be easily transported inside a building. Four wideband antennas located on the roof of a test site receive the signal transmitted by the mobile radio. The signals are conveyed from the antennas to four corresponding receivers via low loss cable that extends from the roof to the receivers disposed in a central location. The receivers demodulate the signal transmitted by the mobile radio using an analog-to-digital (A/D) converter board disposed inside a host personal computer (PC), which samples the signal at 1.7 s intervals for 5.5 ms and processes the raw data to determine the Time of Arrival (TOA). The system uses two receiver computers, each with a dual channel A/D board inside. The output from the receiver boxes is fed into a dual channel A/D board on two host computers. Each of the host computers processes the signal on each channel of the A/D board to determine the TOA for each channel relative to a trigger common to both channels on the A/D board. The TOA algorithm is based on finding the leading edge of the cross correlation function of the PRN sequence that is available at the output of the correlator using frequency domain techniques. TOAs are transferred via wireless local area network to the RAM-drive of a third computer acting as the base computer. From the TOAs, the base computer calculates time differences (TDs) and determines the two-dimensional position of the transmitter. This position is then plotted in real time on a building overlay.

The Peterson system suffers from a number of shortcomings. The range between the target radio and each reference radio is determined by measuring the duration of time required for a signal to travel between the radios. This information can be determined from a one-way communication only if the target radio and the reference radios remain synchronized to the same time reference. That is, the transmitting radio establishes the time of transmission of the signal based on its local clock, and the receiving radio determines the time of arrival of the signal based on its local clock which must constantly be synchronized to the same time reference as the clock of the transmitter. The signal propagation duration can then be determined essentially by subtracting the time of transmission from the time of arrival.

Because the Peterson system uses this one-way measurement technique, the system requires synchronization between the clocks of the transmitter and the four receivers. Unfortunately, the precise time synchronization required to accurately measure the duration of the signal propagation cannot tolerate significant time drift of any local clocks over time. Consequently, all of the clocks of the system must be highly accurate (i.e., on the order of 0.03 parts per million (ppm)), thereby increasing the cost and complexity of the system.

The requirement in the Peterson system to keep the transmitter and receiver clocks synchronized has further implications on the accuracy of the position estimates made from the one-way ranging signals. Asynchronous events occur within each radio which cannot readily be characterized or predicted in advance. These events introduce errors in the radio with respect to knowledge of the actual time of transmission and time of arrival, thereby degrading the accuracy of the range and position estimates.

Developed to demonstrate the feasibility of indoor geolocation, Peterson's test system does not address a number of technical issues required to construct a commercially useful system. For example, the receiver antennas are fixedly mounted (immobile) and cabled to receivers in a remote location. Consequently, the system is not adaptable to varying transmission conditions and cannot adjust to or compensate for scenarios where the radio of interest cannot communication with one or more of the reference receivers. Signal processing and analysis are performed with standard-size personal computers and other bulky experimental equipment. The system uses a relatively low chipping rate and remains susceptible to multipath interference, impacting the accuracy and operability of the system. Further, the position of radio determined by the system is only a two-dimensional position (i.e., in a horizontal plane). Finally, Peterson's test system cannot handle the high Doppler rates associated with rapidly moving mobile communication devices.

Accordingly, there remains a need for a commercially viable position location system capable of quickly and accurately determining the three-dimensional indoor or outdoor position of a compact mobile communication device in the presence of severe multipath interference for use in the aforementioned practical applications.

SUMMARY OF THE INVENTION

It is an object of the present invention to rapidly, reliably and accurately determine the three-dimensional position of a mobile communication device in a variety of environments, including urban areas and inside buildings where multipath interference can be great.

It is a further object of the present invention to incorporate position location capabilities into a compact, handheld or portable mobile communication device useful in a wide array of applications, including location and/or tracking of people and items such as: military personnel and equipment, emergency personnel and equipment, valuable items, vehicles, mobile telephones, children, prisoners and parolees.

It is another object of the present invention to minimize the effects of interference caused by multipath signal propagation in a position location system, thereby providing highly accurate three-dimensional position estimates even under severe multipath conditions.

It is yet another object of the present invention to reduce the cost of a position detection system by avoiding the need for synchronization to the same timing reference throughout the system, thereby eliminating the need for certain expensive components, such as highly accurate clocks.

It is a still further object of the present invention to use state-of-the-art spread spectrum chipping rates and bandwidths to reduce multipath interference and improve position measurement accuracy in a position location system.

Another object of the present invention is to separate multipath interference from direct path signals to accurately determine the time of arrival of the direct path signal to accurately determine range.

Yet another object of the present invention is to minimize errors caused by processing delays that are difficult to characterize or accurately predict.

Still another object of the present invention is to provide a self-healing system, wherein a mobile communication device can adaptively rely on any combination of fixed radios and other mobile radios to determine its own position under varying communication conditions.

A further object of the present invention is to minimize design and manufacturing costs of a position-locating mobile communication device by using much of the existing hardware and software capability of a conventional mobile communication device.

A still further object of the present invention is to incorporate position location capabilities into a mobile communication device being used to transmit or receive voice or data information, such that the device can communicate and establish its position at the same time without disruption of the voice or data communication.

Yet another object of the present invention to accurately compensate for signal Doppler shifts affecting ranging signals transmitted or received by a mobile communication device located on a moving vehicle.

The aforesaid objects are achieved individually and in combination, and it is not intended that the present invention be construed as requiring two or more of the objects to be combined unless expressly required by the claims attached hereto.

In accordance with the present invention, a position location communication system accurately and reliably determines the three-dimensional position of a handheld, portable or vehicle-mounted, spread spectrum communication device within milliseconds without interruption of voice or data communications. Using spread spectrum waveforms and processing techniques, the system of the present invention is capable of determining position location to an accuracy of less than one meter in a severe multipath environment.

More particularly, the system of the present invention employs a two-way, round-trip ranging signal scheme in which the time of arrive of the ranging signals is accurately determined to yield accurate range estimates used to calculate the position of a mobile radio via trilateration. A master or target mobile radio transmits outbound ranging pulses to plural reference radios which respond by transmitting reply ranging pulses that indicate the location of the reference radio and the pulse turn around time (i.e., the time between reception of the outbound ranging pulse and transmission of the reply ranging pulse). Upon reception of the reply ranging pulse, the master radio determines the signal propagation time, and hence range, by subtracting the turn around time and internal processing delays from the elapsed time between transmission of the outbound ranging pulse and the time of arrival of the reply ranging pulse. In this manner, the individual radios do not need to be synchronized to a common time reference, thereby eliminating the need for highly accurate system clocks required in conventional time-synchronized systems. The brief ranging pulses can be interleaved with voice and data messages or incorporated into a messaging scheme in a non-intrusive manner to provide position detection capabilities without disruption of voice and data communications.

To provide high accuracy range estimates, the time of arrival of the ranging pulses are precisely estimated. By performing internal delay calibration, errors caused by difficult-to-predict internal transmitter and receiver delay variations can be minimized. The Doppler shift of each arriving ranging pulse is estimated and compensated for in determining the pulse's time of arrival.

The system uses state-of-the-art spread spectrum chipping rates and bandwidths to reduce multipath interference, taking advantage of existing hardware and software to carrying out a portion of the TOA estimation processing. Leading edge curve fitting is used to accurately locate the leading-edge of an acquisition sequence in the ranging pulse in order to further reduce effect of multipath interference on TOA estimates. Frequency diversity is used to orthogonalize multipath interference with respect to the direct path signal, wherein an optimal carrier frequency and phase is identified and used to estimate the TOA to minimize the impact of multipath interference.

Further, the system of the present invention is self-healing. Unlike conventional systems, which require communication with a certain set of fixed-location reference radios, the system of the present invention can use a set of reference radios that includes fixed and/or mobile radios, wherein the set of radios relied upon to determine the location of a mobile communication device can vary over time depending on transmission conditions and the location of the mobile communication device. Any combination of fixed or mobile radios of known positions can be used as the reference radios for another mobile radio in the system, thereby providing adaptability under varying conditions.

The ranging and position location technique of the present invention is useful in wide variety of applications, including location and/or tracking of people and items such as: military personnel and equipment, emergency personnel and equipment, valuable items, vehicles, mobile telephones, children, prisoners and parolees.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION OF THE PREFERRED EMBODIMENTS

In accordance with the present invention, a handheld or portable communication device provides accurate, reliable position location information within milliseconds without interruption of audio, video or data communications. Using spread spectrum waveforms and processing techniques, the system of the present invention is capable of determining position location to an accuracy of less than one meter in a severe multipath environment. In particular, a two-way time-of-arrival messaging scheme is employed to achieve the aforementioned objectives, while eliminating the need for highly accurate system clocks required in conventional time-synchronized systems. By performing internal delay calibration, Doppler compensation, frequency diversity and leading-edge-of-the-signal curve fitting, a highly accurate estimate of ranging signal time of arrival can be obtained, ensuring the accuracy of the range and position calculations based thereon. Unlike conventional systems which require communication with a certain set of fixed-location reference communication devices, the system of the present invention can use a set of reference communication devices that includes fixed and/or mobile communication devices, wherein the set of communication devices relied upon to determine the location of a mobile communication device can vary over time depending on transmission conditions and the location of the mobile communication device.

Figure 1:
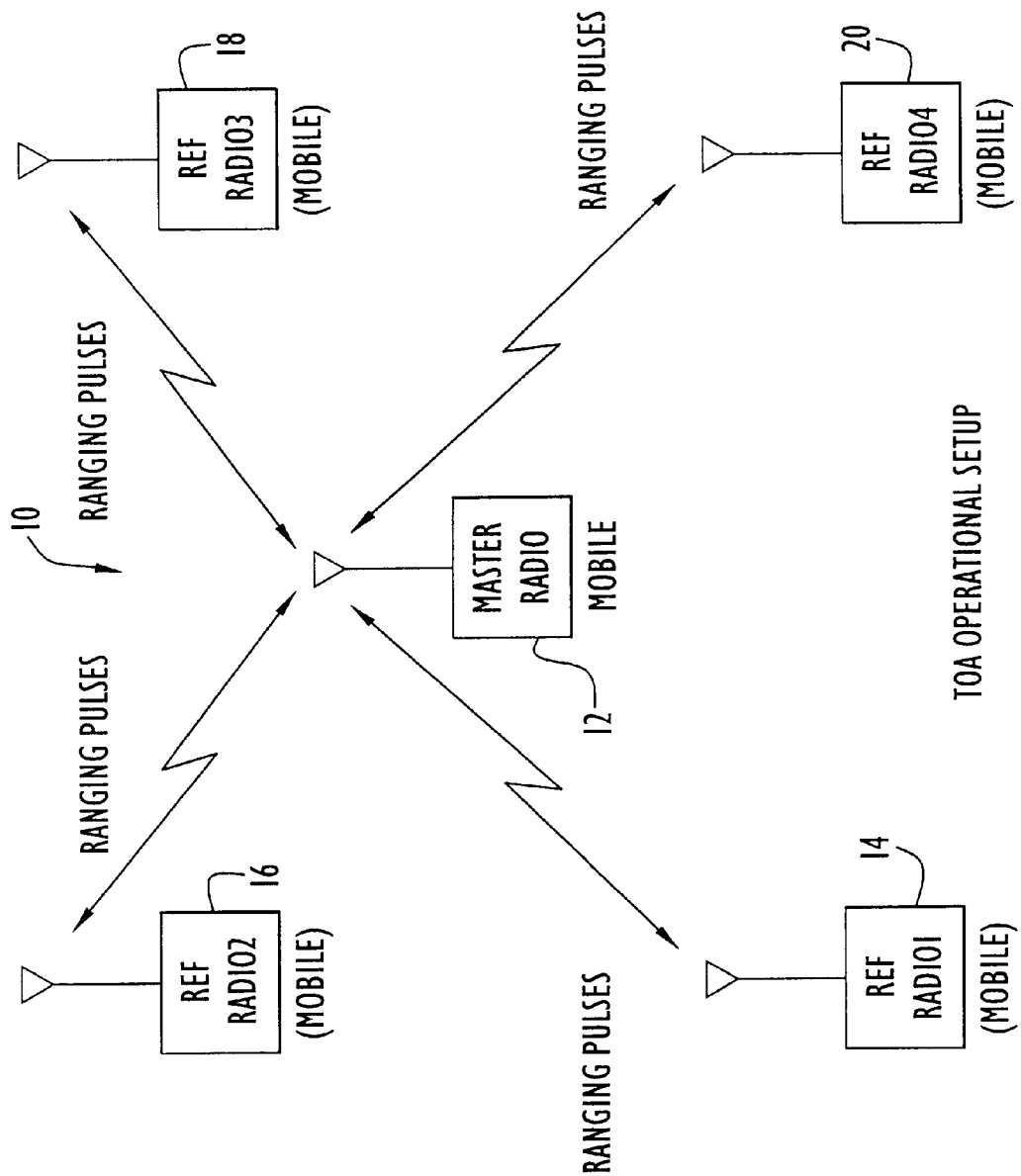
FIG. 1 is a diagrammatic view of the operational setup of the position location system according to the present invention.

Referring to FIG. 1, a position location system 10 includes a target or "master" mobile communication device or "radio" 12 communicating with four reference communication devices 14, 16, 18 and 20. As used herein and in the claims, a mobile communication device or mobile radio is any portable device capable of transmitting and/or receiving communication signals, including but not limited to: a handheld or body-mounted radio; any type of mobile telephone (e.g., analog cellular, digital cellular or satellite-based); a pager or beeper device; a radio carried on, built into or embedded in a ground-based or airborne vehicle; or any portable electronic device equipped with wireless transmission and reception capabilities, including multimedia terminals capable of transmitting audio, video and data information.

Each of reference radios 14, 16, 18 and 20 can be any radio located at a known position that is capable of communicating with the master radio 12 in the manner described herein to convey position and range-related information. For example, one or more of the reference radios can be a beacon-like radio fixedly mounted in a known location, such as on a tower or building. One or more of the reference radios can also be a mobile radio capable of determining its position from others sources, such as from reception of global position system (GPS) signals or from being presently located at a surveyed position whose coordinates are known and entered into the radio (the reference radios are not themselves GPS satellites). Finally, as explain in greater detail hereinbelow, one or more of the reference radios relied upon by a particular master radio can be another mobile communication device similar or identical to the master radio, wherein the reference radio determines its own position in accordance with the technique of the present invention (in this case, the "reference" radio functions as both a reference radio for other radios and as its own "master" radio). The fact that each reference radio could potentially be a mobile radio is indicated in FIG. 1 by the designation "(MOBILE)" next to each of reference radios 14, 16, 18 and 20.

Master radio 12 communicates with the four reference radios 14, 16, 18 and 20 to determine its location in three dimensions. Specifically, master radio 12 and each of reference radios 14, 16, 18 and 20 includes an antenna coupled to a transmitter and a receiver for transmitting and receiving ranging pulses. The antenna, transmitter and receiver of each radio may also be used for other communications, such as audio, video and data messages. The time of arrival (TOA) of ranging pulses transmitted between the master and reference radios is used to determine the range to each reference radio, and a conventional trilateration technique is then used to determine from the range measurements the location of the master radio with respect to the reference radios. Each reference radio must know its own position and convey this information to the master radio to enable the master radio to determine its position from the ranging pulses exchanged with the reference radios.

Importantly, the system of the present invention employs a two-way or round-trip ranging message scheme, rather than a one-way TOA scheme, such as those conventionally used to estimate range. As seen from the bi-directional arrows in FIG. 1, master radio 12 transmits to each of the reference radios 14, 16, 18 and 20 outbound ranging pulses or "packets" and receives back from each reference radio a reply ranging pulse. For example, master radio 12 sequentially exchanges ranging pulses with each individual reference radio, first exchanging ranging pulses with reference radio 14, then with reference radio 16, etc.

By precisely knowing the time of transmission of the outbound ranging pulse, the far-end turn around time at the reference radio, the time of arrival of the reply ranging pulse, and internal transmission/reception processing delays, the master radio can precisely determine the signal propagation time between itself and each reference radio. More specifically, the one way signal propagation time or one way time of arrival ($T_{TOA}$) is given by:

$$T_{TOA}=0.5(T_{RTT}-T_{dc\ master}-T_{dc\ reference}-T_{TAT\ reference}+\Delta T_{REF\ CF\ offset}+\Delta T_{MAS\ CF\ offset}) \quad (1)$$

where $T_{RTT}$ is the total round trip elapsed time from transmission of an outbound ranging pulse to reception of a corresponding reply ranging pulse, $T_{dc\ master}$ is the internal delay in the master radio (determined from delay calibration), $T_{dc\ reference}$ is the internal delay in the reference radio, $T_{TAT\ reference}$ is the reference radio turnaround time, $\Delta T_{REFCFoffset}$ is a time offset due to curve fitting the ranging packet data at the reference radio, and $T_{MAS\ CF\ offset}$ is a time offset due to curve fitting the ranging packet data at the master radio.

Although separately represented in equation (1), the accounting for the internal processing delays ($T_{dc\ master}$ and $T_{dc\ reference}$) and adjustments for curve fitting the ranging pulses ($\Delta T_{REF\ CF\ offset}$ and $\Delta T_{MAS\ CF\ offset}$), described in greater detail hereinbelow, can be considered part of accurately determining the ranging pulses' time of arrival TOA; thus, the one way signal propagation time $T_{TOA}$ can more generally be described as one half of the difference between a) the elapsed time between the time of transmission of the outbound ranging pulse and the time of arrival of the reply ranging pulse and b) the turn around time $T_{TAT}$. To simplify the messaging scheme and computation of the propagation time, the turn around time $T_{TAT}$ can be made constant simply by having the reference radio transmit the reply ranging pulse at a fixed amount of time after the time of arrival of the outbound ranging pulse.

Once the two-way signal propagation time is determined, the range is then readily calculated as the velocity of the signal through the propagating medium (e.g., the speed of light through air) multiplied by the one-way propagation time, or $$Range=C \times T_{TOA} \quad (2)$$

where C is the speed of light ($2.998 \times 10^8$ m/sec). By determining the range to each of four reference radios in this manner, the master radio can determine its own location from these ranges and the known locations of the reference radios using well-known trilateration computations.

Note that the time of transmission of the outbound ranging pulse is known by the master radio in its own time reference frame. Likewise, the time of arrival of the reply ranging pulse is known by the master radio in its own time reference frame. The turn around time ($T_{TAT}$) is an absolute time duration, unrelated to a particular timing reference of any local clock. That is, the turn around time (which can be a fixed period of time) is determined by the reference radio as the difference between the time of transmission of the reply ranging pulse transmitted by the reference radio and the time of arrival of the outbound ranging pulse at the reference radio. While the time of arrival and time of transmission at the reference radio are determined in the time reference frame of the reference radio's local clock, the resulting time difference ($T_{TAT}$) is independent of the reference time frame of the reference radio. In fact, as previously mentioned, the turn around time can be made constant by transmitting the reply ranging pulse a fixed period of time after arrival of the outbound ranging pulse. Thus, the round trip propagation time can be determined by the master radio in its own timing reference kept by its local clock without reference to or synchronization with the timing reference of any of the clocks of the reference radios (i.e., system synchronization is not required). In effect, the master radio "starts a timer" when the outbound ranging pulse is transmitted, "stops the timer" when the reply ranging pulse arrives, and then subtracts the turn around time and internal processing delays from the "timer's elapsed time" to obtain the duration of the round-trip signal propagation.

The two-way or round-trip messaging approach eliminates the need to synchronize the local clocks of the master radio and the reference radios to the same timing reference. Consequently, the local clocks can have a relatively low accuracy, thereby reducing system complexity and cost. That is, conventional systems that maintain synchronization of the local clocks need highly accurate clocks (e.g., 0.03 ppm) and periodic synchronization processing to prevent the clocks from drifting relative to each other over time. In contrast, the clocks of the present invention can be accurate, for example, to approximately 1 ppm. As used herein, the term "low accuracy clock(s)" refers to a clock having a low accuracy relative to the accuracy of present state-of-the-art clocks used in time-synchronized systems, specifically, an accuracy in the range between approximately 0.5 ppm and 10 ppm. While the clocks of the present invention will experience significant drift over time, this drifting does not impact system performance, because the system does not rely on synchronization of the clocks. More specifically, the system of the present invention looks at the round trip delay time of signals between the master and reference radios. Even with relatively low accuracy clocks, the instantaneous or short-term drift or variation experienced by the local clocks of the master and reference radios during the brief ranging session are insignificant. Of course, it will be understood that higher accuracy clocks can be used in the communication device of the present invention.

As will be appreciated from the foregoing, the radios of the present invention must be able to accurately determine the time of transmission and the time of arrival of the ranging pulses in order to accurately measure the range between the radios and to accurately estimate the position of the master radio. The present invention includes a number of techniques for accurately determining the true time of arrival and time of transmission, even in the presence of severe multipath interference which conventionally tends to degrade the accuracy of the time of arrival estimate.

As previously explained, asynchronous events occur within each radio which cannot readily be characterized or predicted in advance. These events introduce errors in the radio with respect to knowledge of the actual time of transmission and time of arrival, thereby degrading the accuracy of the range and position estimates. In other words, the time it takes for a signal to be processed within each radio is not constant over time, and to assume that the processing delay has a fixed value introduces inaccuracy in the time of arrival and time of transmission estimates.

Figure 2:
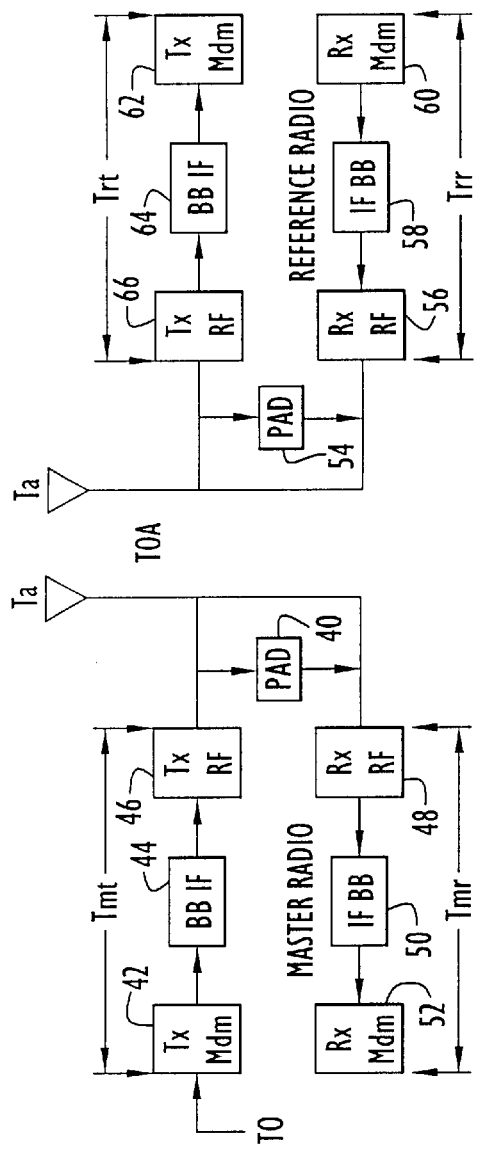
FIG. 2 is a functional block diagram illustrating the internal delay calibration processing performed by the master radio and the reference radios in accordance with an exemplary embodiment of the present invention.

According to the present invention, to minimize processing delay timing errors resulting from asynchronous events that occur within the signal processors of the radios, each radio performs internal delay calibrations in order to accurately estimate the actual internal processor time delays that occur when processing the ranging pulses. Referring to FIG. 2, the master radio performs an internal delay calibration using a loop back through pad 40 to determine internal signal delays (Tmt+Tmr) in the master radio for correction purposes. The delay Tmt is the master radio transmitter delay. It is the sum of the signal delays through the transmit modem (Tx mdm) 42 where the transmit signal is implemented, the transmit baseband to intermediate frequency (BB-IF) conversion 44, and the transmit radio frequency (Tx RF) analog circuitry 46 of the master radio. The delay Tmr is the master radio receiver delay. It is the sum of the delays through the receive radio frequency (Rx RF) analog circuitry 48 of the master radio, the IF-BB conversion 50, and the receive modem (Rx mdm) 52 where demodulation processing occurs.

Each reference radio also performs an internal delay calibration. Referring again to FIG. 2, the reference radio employs a loop back through pad 54 to determine the reference radio internal delay (Trt+Trr). The delay Trr is the reference radio receiver delay comprising the sum of the delays through the Rx RF analog circuitry 56 of the radio, the IF-BB conversion 58, and the Rx modem 60 where demodulation processing occurs. The delay Trt is the reference radio transmitter delay comprising the sum of the delays through the Tx modem 62, the transmit BB-IF conversion 64, and the Tx RF analog circuitry 66 of the reference radio.

The value for the master and reference radio antenna delay Ta (see FIG. 2) is a constant preloaded into the radios and combined with the results of delay calibration to reference the time of arrival to the antenna/air interface. The delay Ta is determined by measuring the delay through a large sample of antennas and cabling, over a range of operating temperatures, and calculating the mean and standard deviation of the measured values. Note that cabling delays for cabling between antenna and electronics are included in the value of Ta.

Thus, the internal processing delay of the master radio ($T_{dc\ master}$) seen in equation (1) is determined from the master radio transmitter and receiver delays Tmt and Tmr determined from the calibration process and the estimated antenna delay Ta. Similarly, the internal processing delay of each reference radio ($T_{dc\ reference}$) includes the reference radio transmitter and receiver delays Trt and Trr determined from the calibration process and the estimated antenna delay Ta. The total elapsed time measured by the master radio between transmission of the outbound ranging pulse and reception the reply ranging pulse includes time attributable to propagation of the pulse signals and time attributable to processing delays within the radios. By accurately estimating and subtracting out the time attributable to processing delays, the signal propagation time (and hence the range) can be more accurately determined.

The internal delay calibration performed in the radios of the present invention is one of the keys to getting repeatable accuracy with low resolution clocks. In essence, by sending calibration signals through the same processing used to subsequently transmit the actual ranging pulse, the difficult-to-characterize processing delay variations can be calibrated out to yield a more accurate measurement.

The internal delay calibration in the radios can be performed as often as necessary to ensure a desired degree of accuracy in the internal delay estimation. For example, the calibration can be performed during a ranging session to yield current estimates for the ranging session, or the calibration can be performed periodically, substantially independent of the timing of ranging sessions. Multiple trials can be performed and averaged to reduce the variance of the delay estimate. Where multiple ranging pulses are to be transmitted at different carrier frequencies, trials can be performed at plural frequencies. For example, if the carrier frequencies fall within a frequency band, calibration can be performed in the middle of the band and at each end of the band.

Figure 3:
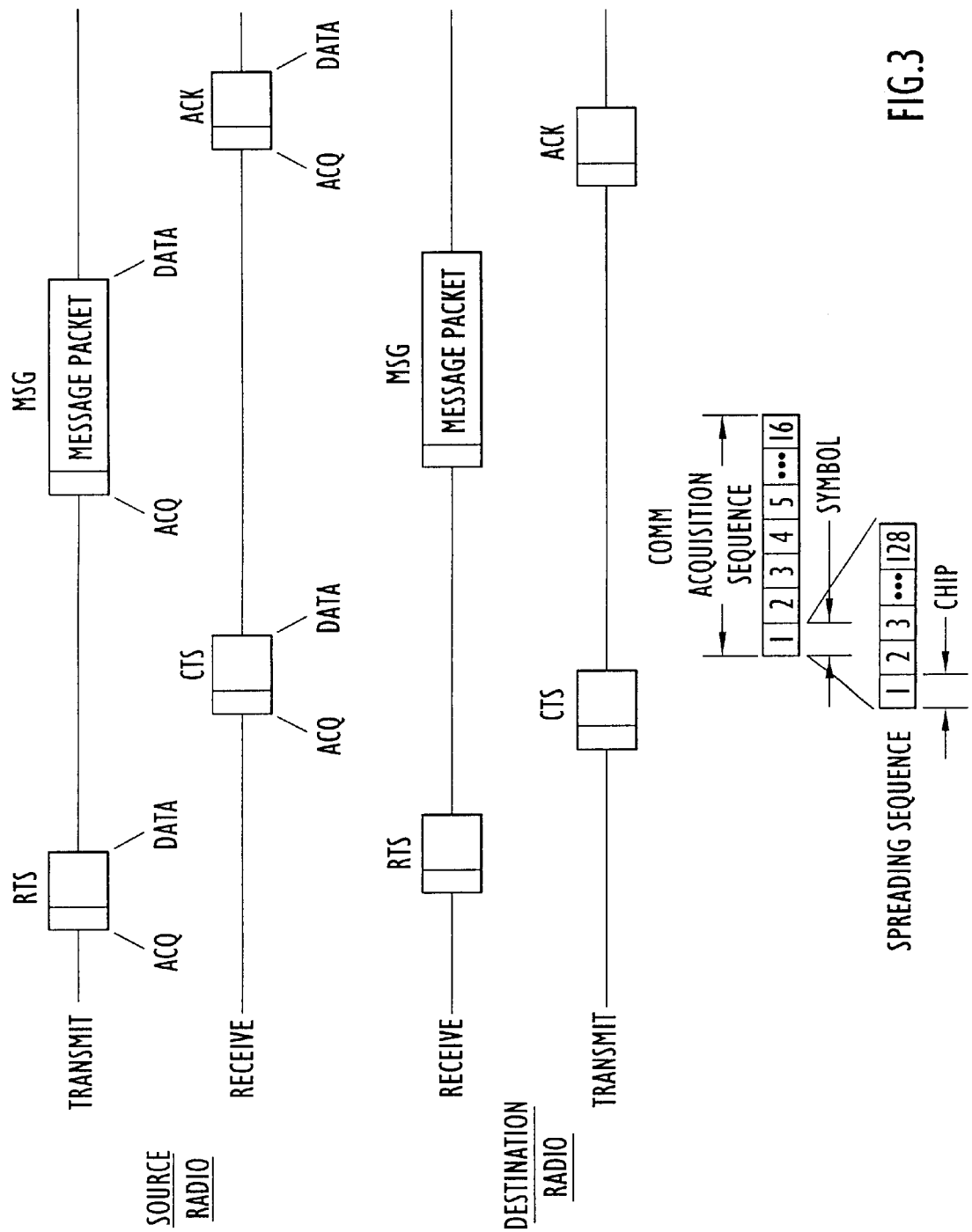
FIG. 3 is a message timing diagram illustrating a typical message exchange in a conventional CSMA/CA protocol.

The following exemplary embodiment of the present invention further illustrates the foregoing aspects of the present invention as well as other features and advantages of the present invention. To take advantage of existing hardware and software found in certain radios, in accordance with the exemplary embodiment, the messaging protocol used for ranging can be derived from the Carrier Sense Multiple Access with Collision Avoidance (CSMA/CA) protocol used by these radios. In conventional CSMA/CA messaging, a network of communication devices share a common communication resource, such as one or more communication channels. The protocol calls for first reserving the channel with an exchange of reservation messages followed by an exchange of the message itself and a corresponding acknowledge message in reply. More specifically, as shown in FIG. 3, a source device attempting to transmit a message to a destination device transmits an initial request-to-send (RTS) message to the destination device to notify the destination device and any other network devices sharing the channel of the source device's request to use the channel to transmit the message. If the RTS message is successfully received by the destination device and the channel is available, the destination device replies to the source device with a clear-to-send (CTS) message. Upon receiving the CTS message, the source device transmits to the destination device an information message (MSG) containing, for example, audio, video and/or data. If the information message is successfully received, the destination device transmits an acknowledge (ACK) message back to the source device, thereby concluding the message exchange.

Each RTS, CTS, MSG and ACK message comprises an acquisition portion followed by a data portion. As shown in FIG. 3, the acquisition portion of the waveform begins with a communication acquisition sequence (comm. acquisition) comprising sixteen 4 μs symbols with 128 chips each.

The basic CSMA/CA messaging scheme and the associated radio hardware and software required to handle CSMA/CA messages can be employed to transmit ranging pulses required to accurately determine the round-trip signal delay between pairs of mobile communication devices. For example, the RTS message can be adapted to notify the network of a master radio's request to reserve a communication channel for a period of time sufficient to complete a ranging session (i.e., exchange a sequence of ranging pulses), and the CTS message can be adapted to reply to the modified RTS message to indicate that the reference radio is prepared to receive the ranging pulses. Further, the acquisition portion of the CSMA/CA waveform can be employed in the ranging pulses themselves to facilitate reception of ranging pulses using hardware and software designed to receive conventional CSMA/CA messages.

Figure 4:
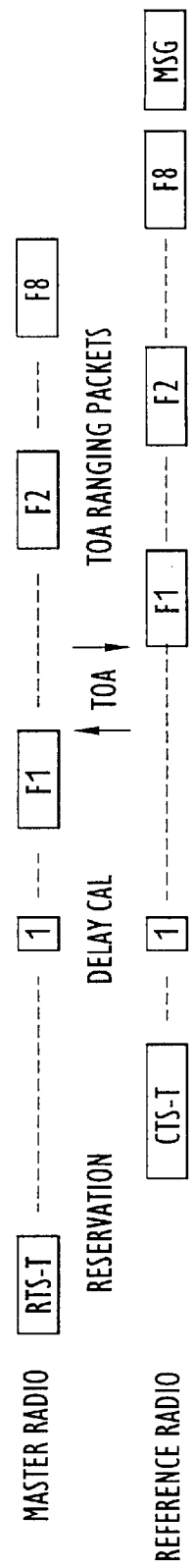
FIG. 4 illustrates a ranging pulse exchange sequence performed by the master radio and a reference radio during a ranging session in accordance with an exemplary embodiment of the present invention.

The TOA ranging protocol to a single reference in accordance with the exemplary embodiment is shown in FIG. 4. Like channel reservation in a system employing a CSMA/CA protocol for conventional communications, the master radio initiates the time of arrival (TOA) ranging session by transmitting a channel reservation request message RTS-T requesting access to a communication channel for a period of time required to exchange a sequence of ranging pulses with a particular reference radio (the ranging process is repeated with each reference radio in sequence). By way of example, the RTS-T can be a modified RTS message which includes a bit set in the data field indicating the time of arrival (TOA) ranging mode rather than a standard communication session set up by a conventional request-to-send message. The master radio also sets a "delay calibration" bit in the RTS-T message if a delay calibration has not been performed during a predetermined preceding time period (e.g., no delay calibration has been performed in the past fifteen minutes). This bit alerts the reference radio that the master radio will perform a delay calibration after the reservation is set up using a single internal loop back with the TOA ranging signal in the middle of the ranging band. If neither radio needs to perform a delay calibration, the exchange of ranging pulse starts immediately after the reservation process is complete.

In accordance with the exemplary embodiment, the master radio transmits the RTS-T message to prompt a particular reference radio to perform internal delay calibration and to initiate a sequence of ranging message exchanges at multiple transmission frequencies. The reference radio receives the RTS-T message and reads the TOA data bit. If the requested channel is available, the reference radio transmits a reply reservation message (CTS-T) back to the master radio indicating that the channel is available and the reference radio is ready to exchange ranging pulses with the master radio, thereby completing the reservation for ranging. The reference radio also sets the "delay calibration" bit in the CTS-T if a delay calibration has not been performed in a predetermined preceding time period. This bit alerts the master radio that the reference radio will perform a delay calibration after the reservation is set up using a single internal loop back with the TOA ranging signal in the middle of the ranging band.

The RTS-T and CTS-T messages can also include a data portion for conveying information required by the master and reference radio to perform the ranging operation. For example, a destination address field can be used to indicate the destination radio to which a source radio (i.e., the master or reference radio) is directing the subsequent ranging pulses. The data portion of the message can also include information such as the identification of the transmitting radio, a flag or data indicating a ranging mode, or information relating to the state of multipath interference.

Once the master radio and reference radio have exchanged the RTS-T and CTS-T messages and, if necessary, performed delay calibration, the master radio and reference radio exchange a sequence of ranging pulses in rapid succession, with each set of exchanged pulses being transmitted at a different carrier frequency. Diverse frequencies create diverse carrier phases in multipath. Ranging performance is best when the carrier phase of the multipath is 90° with respect to the direct path. If this orthogonality condition is met, the direct path and multipath are separated such that the time of arrival of the direct path pulse can be more precisely determined by curve fitting with minimal effects from multipath. The multiple transmission carrier frequencies can be referred to as "ping" frequencies and the ranging pulses can be referred to as "TOA pings", since a rapid succession of M different frequency pulses or multiple "pings" are transmitted between the radios in search of an optimal frequency.

The TOA ranging waveform is preferably operated in the frequency band from approximately 225 MHz to 2500 MHz and, more preferably, the carrier frequencies for ranging are in the band from approximately 225 MHz to 400 MHz. Due to propagation effects, bandwidth limitations, and effects of wavelength on the Quadrature Multi-Frequency Ranging (QMFR) algorithm described herein, ranging accuracy can be expected to degrade outside of the band from approximately 225 MHz to 400 MHz.

Referring again to FIG. 4, the master radio transmits a first outbound ranging pulse or TOA ping using a first transmission frequency F1. The reference radio receives the first outbound ranging pulse and transmits a first reply ranging pulse to the master radio at the first transmission frequency F1. The reference radio, recognizing that these are ranging packet exchanges, uses a precise, programmable, turnaround time (TAT) from reception of the master ranging packet to transmission of the reference ranging packet back to the master radio.

After receiving the first reply ranging pulse, the master radio transmits a second outbound ranging pulse at a second transmission frequency F2. The master radio also uses a precise, programmable, turnaround time from reception of the reference ranging packet to transmission of the next master ranging packet back to the reference radio, allowing relative TOA at the reference to be used in the processing for determining TOA and range. The reference radio replies to the second outbound ranging pulse with a second reply ranging pulse at the second transmission frequency F2. This process is repeated until ranging pulses have been exchanged for each of eight frequencies F1 through F8 (i.e., an exchange of eight sets of TOA pings). In this manner, the eight sets of ranging pulses are transmitted at eight different carrier frequencies. For example, the first set of ranging pulses uses the carrier frequency Fc, while each following ranging packet increases the carrier frequency by 2.15 MHz. For ranging packet eight, the carrier frequency is at Fc+15.05 MHz. These are the ranging signals that are used to compute the TOA. The TOA is then used to compute the range between the master and reference radios. Intervening delay calibrations and GPS data are not required due to the rapid rate at which these packets are exchanged.

After all eight sets of ranging pulses have been exchanged, the reference radio precisely determines the time of arrival of the ranging pulses, as described below, and send a final message packet (MSG) to the master radio (see FIG. 4). The MSG packet, transmitted at carrier frequency Fc+15.05 MHz from the reference radio to the master radio contains the following data: reference radio delay calibration ($T_{dc\ reference}$); curve fit offset due to curve fitting the ranging packet data at the reference radio ($T_{REF\ CF\ offset}$); the best carrier frequency found by the reference radio (the carrier frequency at which the multipath error is most orthogonal); an estimate of the accuracy of the TOA estimate from curve fitting (quality of fit (QOF)); the reference radio position and position accuracy (e.g., latitude, longitude, altitude, and spherical position standard deviation); and the reference radio velocity and velocity accuracy (e.g., east, north, up and spherical velocity standard deviation). This position and velocity information can be known from the fact that the reference radio is in a location whose coordinates are known, from GPS signals received and processed by the reference radio, or by employing the technique of the present invention by ranging from beacon-like radios or other mobile radios.

Once the ranging sequence is completed with one reference radio, the processes is repeated with another reference radio. In general, to accurately determine the master radio's position in three dimensions, it is necessary to determine the range to at least four reference radios, although range measurements to fewer than four reference radios can be used to update position estimates with some degree of degradation. The master radio will cycle between the M reference radios being used for the particular ranging solution. The value of M can vary from four to ten, for example. Reasonable cycle times are one to ten seconds. If ten reference radios are used with a cycle time of one second, for example, the master radio will perform the ranging protocol every 100 ms as it cycles through the 10 reference radios. If four reference radios are used with a cycle time of 10 seconds, the master radio will perform the ranging protocol in every 2.5 seconds.

Figure 5:
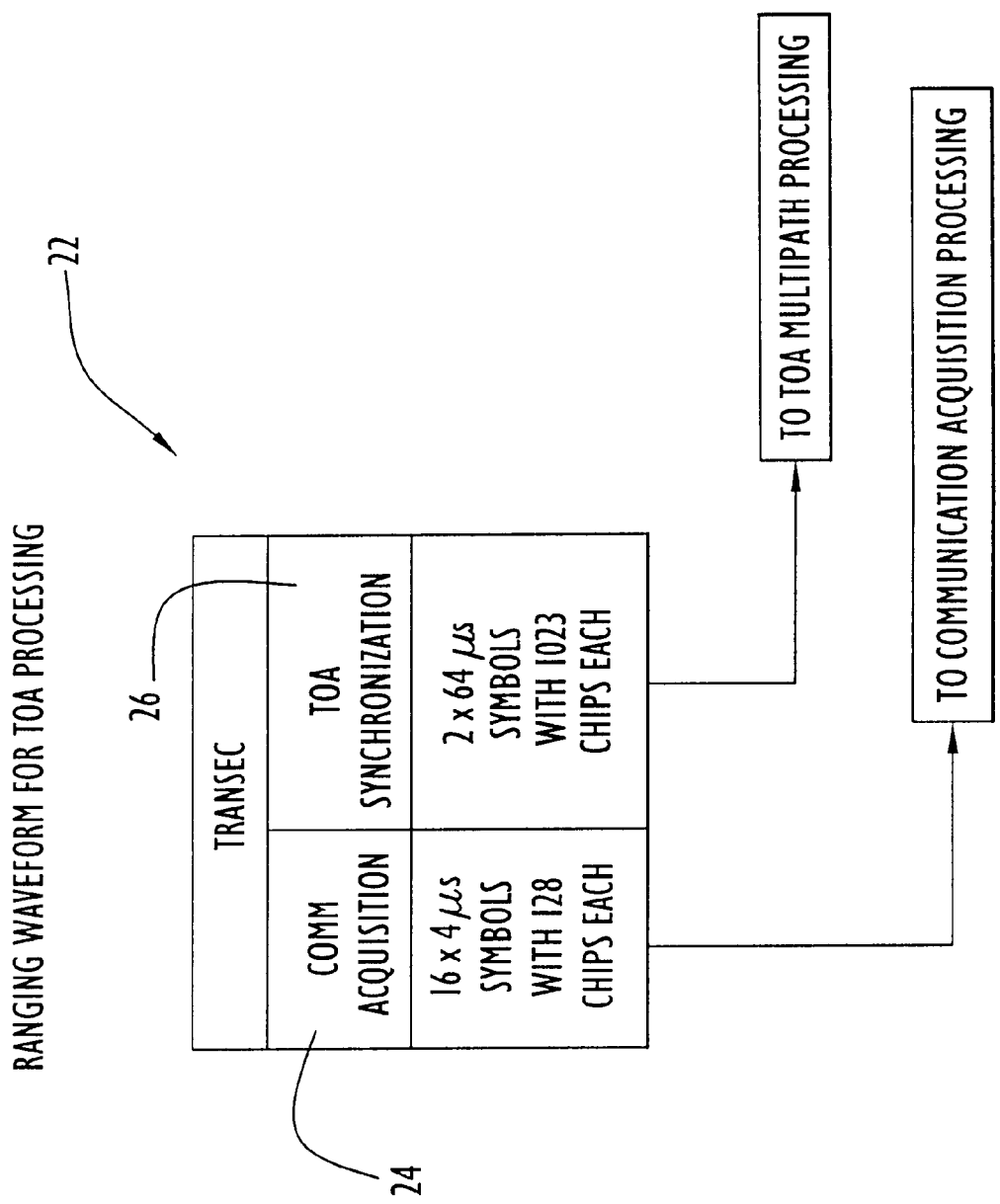
FIG. 5 illustrates the structure and contents of a ranging pulse in accordance with an exemplary embodiment of the present invention.

An example of a range pulse waveform 22 adapted for accurately determining the time of arrival is shown in FIG. 5. The waveform begins with a communication acquisition sequence (comm. acquisition) 24 comprising sixteen 4 $\mu$s symbols with 128 chips per symbol. In this example, the communication acquisition sequence is the same as the communication acquisition sequence in a conventional waveform of the CSMA/CA protocol. Consequently, existing hardware and software in the receiver of the reference radios of the exemplary embodiment can be used to detect the arrival of the TOA ranging pulse. The waveform also includes a time of arrival (TOA) synchronization sequence 26 comprising two, 64 $\mu$s symbols with 1023 chips per symbol (a total of 2046 chips). As described in greater detail hereinbelow, the TOA synchronization sequence is used in conjunction with the communication acquisition sequence to accurately determine the time of arrival of each TOA ping. The acquisition sequence is used by the receiving device to acquire and synchronize with the received message waveform. It will be appreciated that the communication acquisition sequence and the TOA synchronization sequence of the present invention are not limited to the particular waveform described in the exemplary embodiment, and the number and length of the symbols of the communication acquisition sequence and the TOA synchronization sequence can be set to any values suitable for acquiring and processing the ranging waveform in accordance with operational requirements, such as specified probabilities of false alarm and detection and accuracy of the time of arrival estimate.

The ranging operation of the present invention can be employed in a communication system without disruption of audio, video and/or data information also conveyed by the system. For example, the ranging scheme can be seamlessly incorporated into a system employing a CSMA/CA protocol to convey such information. Of course, it will be understood that the messaging scheme of the present invention is not limited to any particular protocol, and any suitable message or signal structure that permits transmission of an outbound ranging pulse and a reply ranging pulse can be used to implement the present invention.

Another aspect to accurately determining the range between the master radio and each of the reference radios is the precise estimation of the time of arrival of the outbound ranging message at the reference radio and the time of arrival of the reply ranging message at the master radio. In accordance with another aspect of the present invention, the timing of the leading edge of a synchronization sequence of the ranging message is accurately determined by assessing and avoiding multipath interference which can degrade the accuracy of the time of arrival estimate. In particular, a two-stage signal acquisition scheme is employed using the communication acquisition sequence and the TOA synchronization sequence of the ranging messages. Detection of the communication acquisition sequence is used to trigger acquisition of the TOA synchronization sequence in which the time of arrival is precisely estimated.

Figure 6:
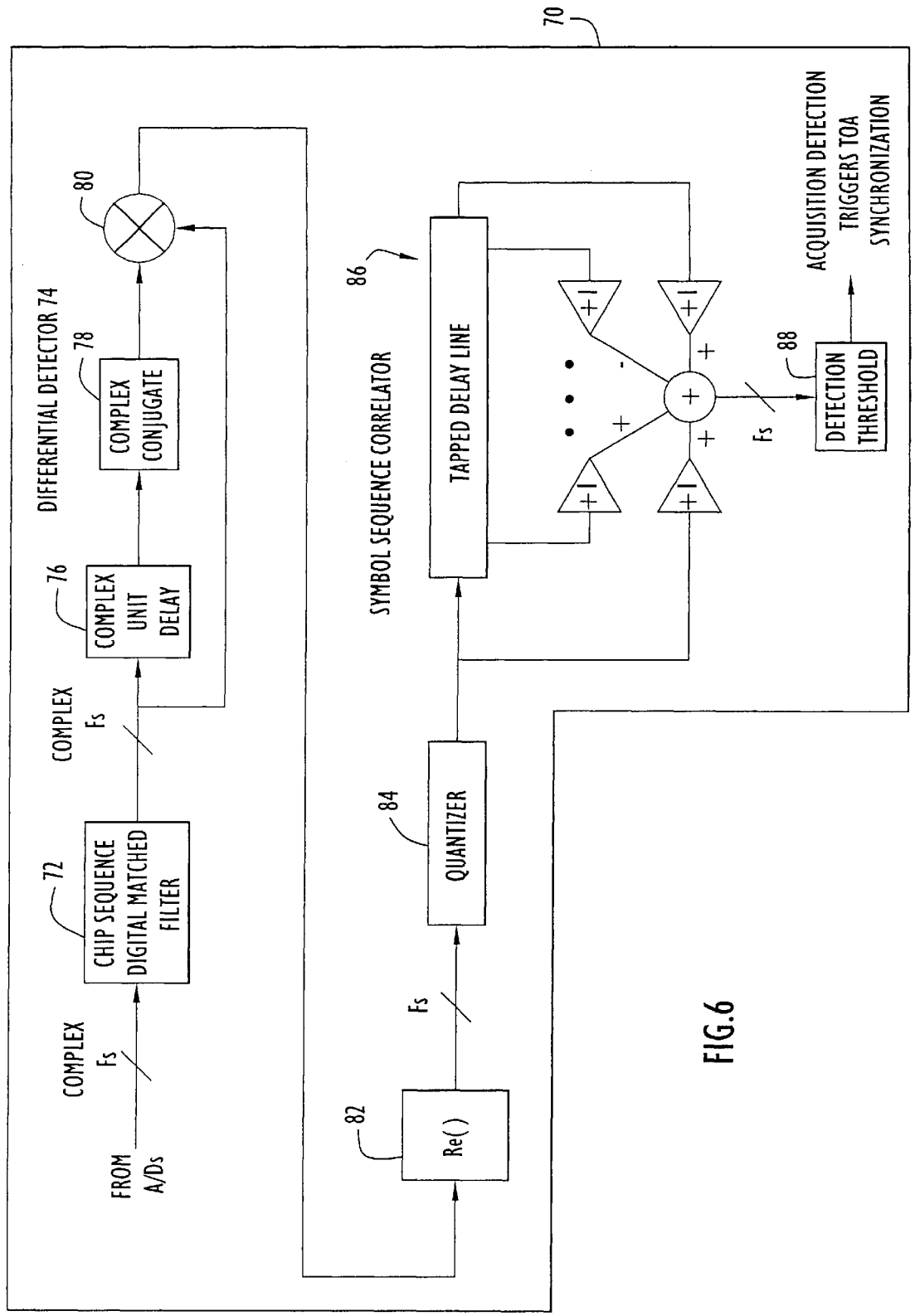
FIG. 6 is a functional block diagram illustrating the acquisition processing employed to detect the communication acquisition sequence of the ranging pulses in accordance with an exemplary embodiment of the present invention.

A functional block diagram illustrating acquisition of the communication acquisition sequence of the spread spectrum ranging message at each radio is shown in FIG. 6. After analog-to-digital (A/D) conversion, the communication acquisition sequence in the form of a spread spectrum complex signal is processed to provide time synchronization for the modem of the reference radio. Specifically, the acquisition detection processing employs digital matched filtering and Barker code correlation to detect the transmitted communication acquisition waveform and to derive the required timing information. By way of example, the communication acquisition processor 70 can be configured to meet the following operational requirements: probability of detection=99.5%, probability of false alarm=$10^{-6}$, and time of detection determined to ¼ of a chip.

The communication acquisition processor 70 includes digital matched filter (DMF) 72 (N=128) having coefficients that are matched to the length 128 PN sequence that is chipping each of the sixteen, 4 μsec comm. acquisition symbols. The DMF 72 de-spreads each of the symbols and provides a peak response when aligned with each symbol. The PN sequence can be identical for each of the sixteen segments. The DMF 72 can be clocked, for example, at 32 MHz, thereby yielding 128 coefficients for the inphase (I) filter section and 128 coefficients for the quadrature (Q) filter section. The DMF coefficients can be programmable.

A differential detector 74 compares the phase of the received signal between two successive symbol intervals. More specifically, differential detector 74 includes a complex delay unit 76 which delays the output of DMF 72 by a symbol interval, a complex conjugate unit 78 which forms the complex conjugate of the delayed signal, and a comparator 80 which receives the output of DMF 72 and the delayed complex conjugate of the output of DMF 72 and produces the differential detector output. The decision variable is proportional to the phase difference between these two complex numbers, which, for BPSK, can be extracted from the real part of the differential detector output (see block 82).

The real portion of the differential detector output is quantized in quantizer 84 and supplied to a symbol sequence correlator 86, such as a Barker code correlator. The output of the Barker code correlator is compared to a detection threshold 88. If the detection threshold is exceeded, a communication detection is declared.

This first stage of the two-stage signal acquisition processing (i.e., detection of the communication acquisition sequence) is the same as the processing used to detect the communication acquisition sequence of a conventional message in the CSMA/CA protocol, thereby allowing existing hardware and software to be used. The communication acquisition processor 70 treats the communication acquisition sequence as a sequence of 16, 128 chip symbols and therefore employs a relatively short matched filter (N=128), resulting in a modest amount of processing. This modest processing load is desirable, since the receiver must continuously perform this processing to detect the communication acquisition sequence (whose arrival time is not known apriori).

While the detection result of the communication acquisition process can be used to estimate the TOA of the ranging pulse (i.e., a one-stage TOA estimation process), a more accurate estimate can be obtained by processing a longer symbol with a longer matched filter. However, continuously running a longer matched filter would require excessive processing. Accordingly, the system of present invention employs a two-stage process, wherein detection of the communication acquisition sequence triggers a second stage in which a longer acquisition symbol is processed with a longer matched filter (i.e., TOA synchronization processing). This additional processing is required only over a limited period of time identified by detection of the communication acquisition sequence, thereby avoiding excessive processing.

Figure 7:
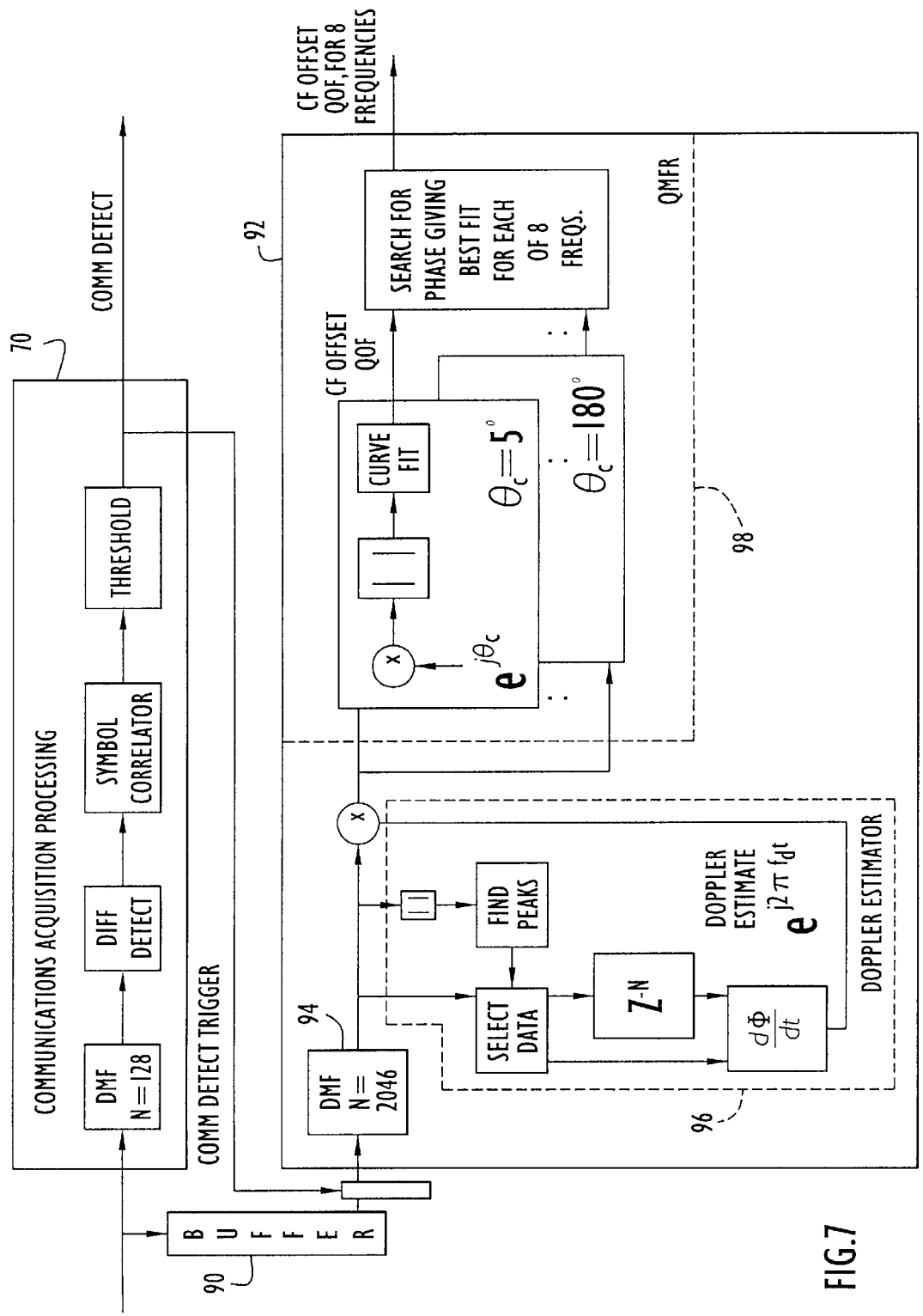
FIG. 7 is a functional block diagram illustrating the processing performed by a reference radio to determine the time of arrival of a ranging pulse, involving Doppler estimation and evaluation and separation of multipath interference from the direct path signal.
Figure 8:
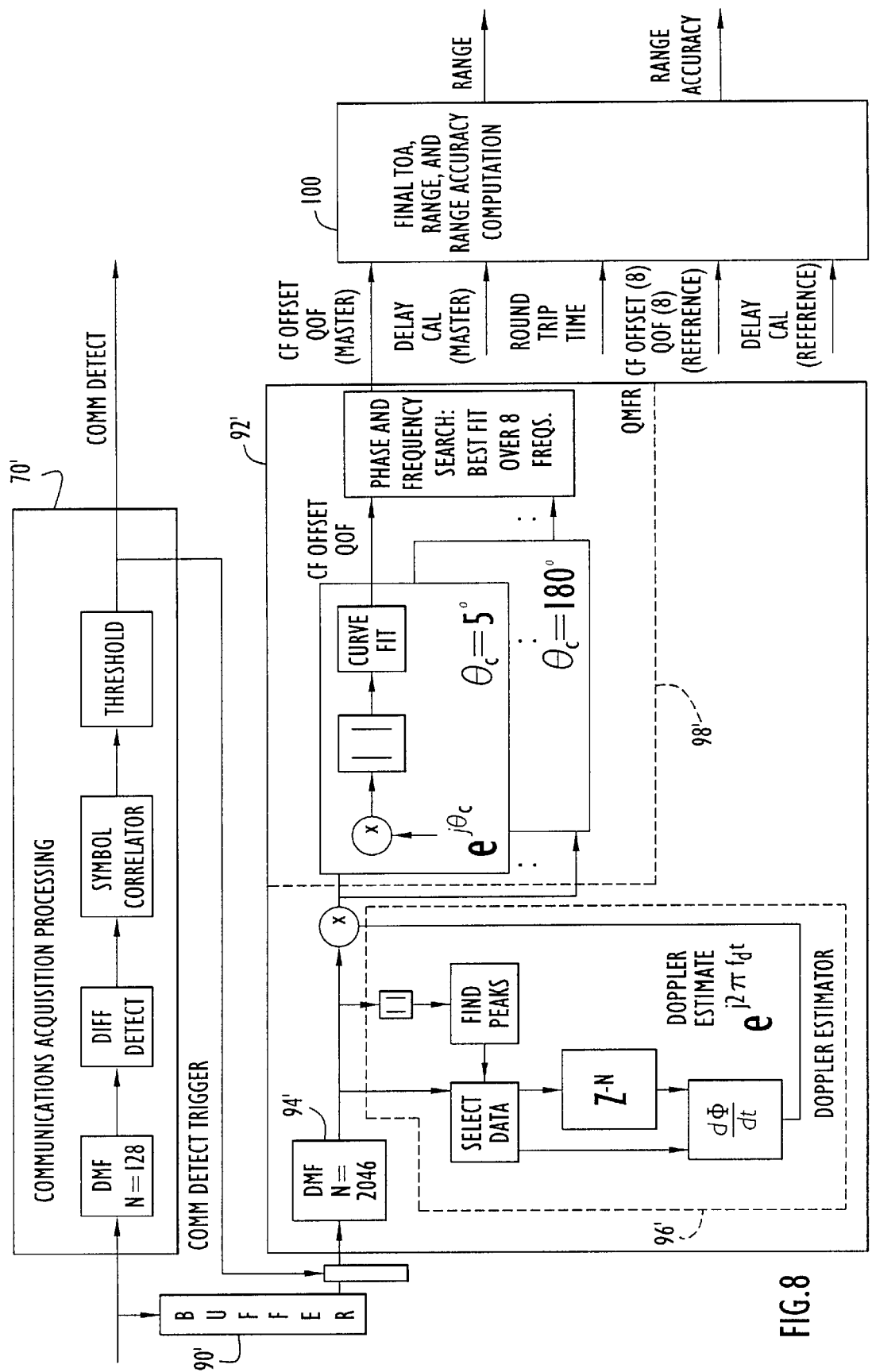
FIG. 8 is a functional block diagram illustrating the processing performed by the master radio to determine the time of arrival of a ranging pulse, involving Doppler estimation and evaluation and separation of multipath interference from the direct path signal.

The TOA estimation processes in a reference radio and in the master radio in accordance with the exemplary embodiment of the present invention are respectively shown in FIGS. 7 and 8. Once a ranging session has been set up from the reservation channel exchange, the reference radio responds to each ranging pulse or "packet" by automatically transmitting a reply ranging pulse at the same carrier frequency after a known, programmable, delay called the turn-around time (TAT). After receiving the ranging pulse from the reference, the master radio tunes to the next carrier frequency and transmits the next ranging pulse at the next carrier frequency after the turn-around time delay. This process is repeated until the eighth and final ranging pulses are transmitted and received.

Upon reception of each of the eight ranging pulses (at frequencies F1 through F8), detection of the communications acquisition sequence of the ranging pulse will trigger a buffer 90 to capture samples of the TOA synchronization sequence from the ranging pulse. The reference radio begins TOA processing once the data from all eight pulses of the ranging session have been captured. Processing begins with the data from the first (F1) ranging pulse. Referring to FIG. 7, in order to accurately determine range and position for rapidly moving mobile communication devices, such as those onboard moving vehicles, the TOA processor 92 determines and compensates for the Doppler effect experienced between master and reference radios in relative motion. Specifically, the buffered 2046 chip TOA synchronization sequence is supplied to a digital matched filter 94 (N=2046). The output of the digital matched filter is then supplied to a Doppler Estimator 96.

In the Doppler estimator 96, twenty-four samples are computed around the expected digital matched filter output peaks of each of the TOA symbols. The twenty-four samples include the peak sample, twelve samples before the peak, and eleven samples after the peak. These samples are used in a clock drift/Doppler offset calculation by first computing their magnitude and locating the peak samples. The peak output of the TOA digital matched filter from the first TOA synchronization sequence will be 75.9375 μsec (2430 samples assuming the late window is 384 samples) after the Barker correlator peak from processing the communications acquisition sequence. The two TOA peaks correspond to the midpoint samples of each of the TOA synchronization symbols and are 63.9375 μsec (2046 samples) apart. The Doppler is estimated by determining the change in phase over the 64 μsec symbol time by comparing the symbols. Specifically, one symbol is delay by the duration of a symbol (represented by $z^{-N}$ in FIG. 7) and compared to the second un-delayed symbol. The 24 complex samples corresponding to the digital matched filter output for the second TOA synchronization symbol are then rotated by the estimated Doppler shift $e^{j2\pi fdt}$ and used for the remaining TOA processing. The twenty-four Doppler-corrected, complex samples from each carrier frequency are supplied to the Quadrature Multi-Frequency Ranging (QMFR) processor 98.

The Quadrature Multi-Frequency Ranging (QMFR) processor 98 employs frequency diversity to identify an optimal transmission frequency and phase that minimize multipath interference. Diverse frequencies create diverse carrier phases in multipath. Ranging performance is best when the carrier phase of the multipath is 90° with respect to the direct path. If this orthogonality condition is met, the direct path and multipath are separated such that the direct path can be more precisely curve fit with minimal effects for multipath.

In the exemplary embodiment, the number of ranging pulses and their carrier frequencies are predetermined.

Specifically, in the example shown in FIG. 4, a fixed number of carrier frequencies at set frequencies covering a predetermined frequency range is used (e.g., carrier frequencies at 2 MHz increments covering a 15 MHz range). In this example, the eight sets of ranging pulses at eight different frequencies are automatically transmitted after the initial exchange of the RTS-T and CTS-T messages are exchanged. In general, the selection of the number of ranging pulses and the values of the carrier frequencies can be determined in any of number of ways. For example, the number of trials/frequencies can be selected from 1 to M depending on the severity of the multipath.

Referring again to FIG. 7, in the reference radio, the Doppler-compensated matched filtered signal received by the QMFR processor 98 is supplied to a bank of phase rotators which rotate the phase of the signal by evenly spaced increments up to one-hundred and eighty degrees. For example, the bank can include thirty-six phase rotators which respectively rotate the signal in 5° increments through 180° (i.e., 5°, 10°, 15°, ..., 175°, and 180°). By evaluating the at each of these phase rotations, a phase rotation that provides the best separation between the multipath signal and the direct path signal for the particular carrier frequency can be identified.

After performing a magnitude function on each phase-rotated signal, a curve fit is performed. Essentially, a replica of the TOA synchronization sequence's multipath-free correlation function out of the matched filter is stored pre-stored (i.e., the multipath-free pulse shape profile is known). The curve fitting involves moving the pulse shape replica through the profile of the phase rotated output of the matched filter and performing a least-mean-square error fit to achieve a curve fitting between the replica pulse shape and the matched filter output to identify the timing of the direct path signal and subsequent multipath signals (at the time of the direct path signal and the multipath signal, the matched filter profile will be similar to the replica profile).

The QMFR processor 98 searches the curve-fit data from each phase rotation to locate the best curve fit. The best curve fit (CF) occurs where the multipath and direct path are orthogonal (90° out of phase). Specifically, the data is searched to find the phase where the optimal pulsewidth occurs at the carrier phase with the shortest path delay. Essentially, the processor identifies the phase at which the direct path signal and the nearest multipath signal are most nearly orthogonal and the timing accuracy of the signal curve fit can be expected to be highest. The curve fitting error provides the quality of fit (QOF) metric that is saved along with the CF offset from the nearest sample time.

The phase rotation process and best curve fit evaluation is repeated for the received ranging message at each of the carrier frequencies, such that a set of phase rotated signals is generated for each ranging message carrier frequency. Thus, after receiving and processing all of the ranging messages, an array of curve-fit ranging signals at different frequencies and phases has been developed and evaluated. For example, with ranging pulses at eight different carrier frequencies, each being processed through thirty-six phase rotators, a total of two-hundred and eighty-eight TOA ranging signals are generated. For each of the eight carrier frequencies, the phase of the TOA signal yielding the best multipath discrimination (best QOF) is identified. In effect, a search is conducted in two dimensions (frequency and phase) to identify for each frequency the phase which best separates multipath signals and minimizes interference therefrom.

The CF offset associated with the best QOF for each of the eight ranging pulses (at frequencies F1–F8), along with the eight corresponding QOFs themselves, are sent to the master radio in the final message packet (MSG) of the ranging session, where one of the CF offsets is used, in effect, to refine the value of the reference radio TAT. The master radio uses the selected reference radio QOF metric, along with the selected master radio QOF, to compute a range accuracy estimate.

As seen in FIG. 8, the TOA processing performed by the master radio is similar to that performed by the reference radio (reflected by use of the numerals 70', 90', 92', 94', 96' and 98'); however, the master radio also employs information determined from the reference radio's TOA processing and supplied to the master radio in the final message packet (MSG) of the ranging sequence, including: the reference radio curve-fit timing offset and quality of fit at the carrier frequency determined to be best by the master radio, and the delay calibration of the reference radio.

Specifically, in the QMFR processor 92', the master radio generates the CF offset and QOF at each of the thirty-six phases for each of the eight reply ranging pulses. QMFR processor 92' then searches in frequency and phase for the curve fit at which the direct path and multipath signals are most orthogonal. After searching the thirty-six phases at each carrier frequency for the best curve fit, the master radio performs the final TOA range and range accuracy computation (block 100). The master radio uses the CF offset, QOF and delay calibration from the reference radio at the frequency determined by the master radio to provide the best QOF, along with the total round trip time (RTT), the estimated CF offset of the reference-to-master radio ranging packet acquisition detection, and the master radio delay calibration to compute the final TOA and range estimates in accordance with equations (1) and (2).

Estimates of the curve fit accuracy at the reference and master radios, determined from the reference and master QOFs, are used to determine a range accuracy estimate. The estimated range and range accuracy are supplied to a navigation system (not shown) which tracks the location solution of the master radio using, for example, Kalman filtering techniques.

Note that the TOA synchronization sequence is not strictly required by the system of the present invention; the receiver can directly use the communication acquisition sequence to evaluate multipath interference and curve fit to determine the leading edge of the signal. For example, the communication acquisition sequence can be continuously buffered and, upon detection, a longer matched filter (N=2048) treating the communication acquisition sequence as one long symbol can be used to perform the TOA estimation. In this case, the relatively rough estimate of the TOA provided by the communication acquisition processing can be used to limit the time range over which the TOA processor match filters the communication acquisition sequence with the 2048 length matched filter. The TOA processing is otherwise similar to the TOA processing shown in FIGS. 7 and 8. However, a more precise estimate can be obtained using the TOA synchronization sequence described above.

While a particular implementation of the TOA processing has been described in conjunction with FIGS. 7 and 8, it will be understood that other implementations and variations in the TOA processing scheme fall within the scope of the invention. For example, schemes which perform different degrees of processing based upon specified accuracy levels can be employed, such as those described in U.S. patent application Ser. No. 09/365,702, entitled "Method And Apparatus For Determining The Position of a Mobile Communication Device Using Low Accuracy Clocks," filed Aug.

2, 1999, the disclosure of which is incorporated herein by reference in its entirety. For example, if a high accuracy TOA mode is selected, the radios can automatically employ frequency diversity without first evaluating at a first frequency whether multipath interference is substantial, and a single ranging message exchange (no frequency diversity) can always be used in a lower accuracy TOA mode.

The master radio determines its own position from the measured range to each of the reference radios via a trilateration technique which can be for example, a conventional trilateration technique. Once the master radio's position has been determined, the master radio can convey this information to other radios or to a controller or coordinator performing tracking and/or mapping of the master radio and perhaps other associated mobile radios. The ranging/position location processing can be performed periodically or initiated by the master radio or a system controller as needed.

As will be understood from the above description, the mobile communication device allows the position location system of the present invention to be self-healing. That is, in situations with a number of mobile radios, each mobile radio may be able to serve as both a master radio to determine its own position and as a reference radio for other mobile radios. Thus, when a particular mobile radio cannot receive adequate ranging signals from a current set of reference radios, the mobile radio can alter the set of reference radios to include mobile radios whose ranging signals are acceptable. For example, a first mobile radio may be relying on four reference radios that are fixed or GPS-based. A second mobile radio maybe positioned such that the signal strength from one of the fixed or GPS-based reference radios is too weak or the positional geometry is such that the four fixed/GPS-based reference radios do not provide accurate three-dimensional information (e.g., two are along the same line of sight). In this case, the second mobile radio can use the first mobile radio as one of the reference radios if this provides better results. This flexibility is in contrast to conventional systems where the mobile radios must rely on fixed transmitters for reception of ranging signals and cannot range off of other mobile radios to determine position.

While shown in FIG. 1 as communicating with four reference radios, it will be understood that the master radio of the present invention can communicate ranging messages with any plurality of reference radios. For example, the master radio can determine some position information from communication with as few as two reference radios. Further, the master radio can exchange ranging messages with more than four reference radios and dynamically select the best four range measurement each time the position location process is performed, based on signal strength of the TOA messages, geometry, etc. In this way, for example, the master radio can determine and use its four nearest neighbors as the reference radios.

The hardware required to implement the system of the present invention easily fits within the physical footprint of a handheld spread spectrum radio, permitting the system to be used in a wide variety of applications. For example, to provide situation awareness in military exercises, the system of the present invention can be used to determine and track the location of military is personnel and/or equipment during coordination of field operations. This would be particularly useful in scenarios where GPS signals are weak or unavailable due to atmospheric conditions, terrain or location of the radio inside a building, or to augment and enhance the accuracy of GPS position information. The position information can be used by a commander to dynamically map the current position of personnel and equipment and to coordinate further movements. Further, individual mobile radios can receive and display position information for other related personnel, so that soldiers in the field are provided with situation awareness for their immediate surroundings.

The system of the present invention can also be used to locate and track non-military personnel and resources located both indoors or outdoors, including but not limited to: police engaged in tactical operations; firefighters located near or within a burning building; medical personnel and equipment in a medical facility or en route to an emergency scene; and personnel involved in search and rescue operations.

The system of the present invention can also be used to track high-value items by tagging items or embedding a mobile radio in items such as personal computers, laptop computers, portable electronic devices, luggage (e.g., for location within an airport), briefcases, valuable inventory, and stolen automobiles.

In urban environments, where conventional position determining systems have more difficulty operating, the system of the present invention could reliably track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; and location of prisoners in a detention facility. The mobile radio could be carried on the body by incorporating the radio into clothing, such as a bracelet, a necklace, a pocket or the sole of a shoe.

The system of the present invention also has application in locating the position of cellular telephones. By incorporating into a conventional mobile telephone the ranging and position location capabilities of the present invention, the location of the telephone can be determined when an emergency call is made or at any other useful time. This capability could also be used to assist in cell network management (e.g., in cell handoff decisions).

While the present invention has been described above in the context of a system that transmits and receives electomagnetic signals through the air, it will be appreciated that the two-way round-trip ranging technique, including the internal delay calibration and TOA processing can be used in other mediums and with other types of signals, including, but not limited to: electromagnetic signals transmitted through solid materials, water or in a vacuum; pressure waves or acoustic signals transmitted through any medium (e.g., seismic, sonar or ultrasonic waves).

Having described preferred embodiments of new and improved method and apparatus for determining the position of a mobile communication device, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A mobile communication device capable of determining range to a reference communication device by exchanging ranging signals with the reference communication device, comprising:

a transmitter configured to transmit to the reference communication device a sequence of outbound ranging signals at different carrier frequencies;

a receiver configured to receive from the reference communication device a sequence of reply ranging signals at the different carrier frequencies in response to the outbound ranging signals; and a processor configured to select from among the reply ranging signals a reply ranging signal at a carrier frequency providing a highest signal timing accuracy, said processor determining a time of arrival of the selected reply ranging signal and the range to the reference communication device from a round-trip signal propagation time of the selected reply ranging signal and a corresponding outbound ranging signal, and wherein said processor performs Doppler compensation on the selected reply ranging signal to reduce errors in estimating the time of arrival of the selected reply ranging signal.

2. The mobile communication device of claim 1, wherein said processor selects the reply ranging signal whose carrier frequency minimizes multipath interference.

3. The mobile communication device of claim 1, wherein said processor comprises:

means for rotating a phase of each reply ranging signal to incremental phase angles over a range of phase angles, said processor selecting from among the reply ranging signals at each carrier frequency and incremental phase angle a reply ranging signal at a carrier frequency and phase providing a highest signal timing accuracy.

4. The mobile communication device of claim 1, wherein said reference communication device transmits each reply ranging signal at a predetermined turn-around time after reception of an outbound ranging signal; and said mobile communication device transmits each successive outbound ranging signal at the predetermined turn-around time after reception of a reply ranging signal, said processor computing the range to the reference communication device using the predetermined turn-around time.

5. The mobile communication device of claim 1, wherein said processor estimates the time of arrival of the selected reply ranging signal using signal curve fitting and computes the range to the reference communication device using a timing adjustment determined from the signal curve fitting.

6. The mobile communication device of claim 5, wherein:

the reference communication device estimates the time of arrival of the outbound ranging signals using signal curve fitting; and said processor of the mobile communication device computes the range to the reference communication device using a timing adjustment determined from the signal curve fitting performed by the reference communication device on the outbound ranging signal corresponding to the selected reply ranging signal.

7. The mobile communication device of claim 1, wherein said mobile communication device performs internal delay calibration to reduce errors in estimating a time of arrival of the reply ranging signal and computes the range to the reference communication device using a timing delay determined from the internal delay calibration.

8. The mobile communication device of claim 7, wherein:

the reference communication device performs internal delay calibration to reduce errors in estimating a time of arrival of the outbound ranging signals; and said processor of the mobile communication device computes the range to the reference communication device using a timing delay determined from the internal delay calibration performed by the reference communication device.

9. The mobile communication device of claim 1, wherein said mobile communication device determines ranges to a plurality of reference communication devices by exchanging ranging signals with each of the reference communication devices, said processor determining the position of said mobile communication device from known positions of said reference communication devices and the range to each of said reference communication devices.

10. The mobile communication device of claim 1, further comprising:

a low accuracy clock adapted to maintain a local timing reference, said mobile communication device determining a time of transmission of the outbound ranging signals and a time of arrival of the reply ranging signals in accordance with the local timing reference, said low accuracy clock not being synchronized with a clock maintaining a local timing reference for the reference communication device.

11. The mobile communication device of claim 1, wherein said mobile communication device is a handheld radio.

12. The mobile communication device of claim 1, wherein said mobile communication device is configured to be carried on a human body.

13. The mobile communication device of claim 1, wherein said mobile communication device is incorporated into clothing worn on the body.

14. The mobile communication device of claim 1, wherein said mobile communication device is a mobile telephone.

15. The mobile communication device of claim 1, wherein said mobile communication device operates onboard a moving vehicle.

16. The mobile communication device of claim 1, wherein said mobile communication device is capable of exchanging ranging signals with reference communication devices while indoors.

17. The mobile communication device of claim 1, wherein said mobile communication device is coupled to a valuable item to facilitate tracking of the valuable item.

18. A position location system for determining the position of a mobile communication device, comprising:

a plurality of reference communication devices having known positions, each configured to transmit and receive ranging signals; and a mobile communication device configured to exchange ranging signals with said reference communication devices, said mobile communication device transmitting to each reference communication device a sequence of outbound ranging signals at different carrier frequencies, each of said reference communication devices transmitting a sequence of reply ranging signals at the different carrier frequencies in response to the outbound ranging signals, wherein;

said mobile communication device determines the range to each reference communication device from a round-trip signal propagation time of a selected outbound ranging signal and a corresponding reply ranging signal transmitted at a carrier frequency providing a highest signal timing accuracy, performs Doppler compensation on the selected reply ranging signal to reduce errors in estimating the time of arrival of the selected reply ranging signal, and determines the position of said mobile communication device from the known positions of said reference communication devices and the range to each reference communication device.

19. The system of claim 18, wherein said mobile communication device selects the reply ranging signal whose carrier frequency minimizes multipath interference.

20. The system of claim 18, wherein said mobile communication device comprises:
means for rotating a phase of each reply ranging signal to incremental phase angles over a range of phase angles, said mobile communication device selecting from among the reply ranging signals at each carrier frequency and incremental phase angle a reply ranging signal at a carrier frequency and phase providing a highest signal timing accuracy for each reference communication device.

21. The system of claim 18, wherein:
each reference communication device transmits each reply ranging signal at a predetermined turn-around time after reception of an outbound ranging signal; and
said mobile communication device transmits each successive outbound ranging signal to each communication device at the predetermined turn-around time after reception of a reply ranging signal, said processor computing the range to each reference communication device using the predetermined turn-around time.

22. The system of claim 18, wherein said mobile communication device estimates the time of arrival of each selected reply ranging signal using signal curve fitting and computes the range to each reference communication device using a timing adjustment determined from the signal curve fitting.

23. The system of claim 22, wherein:
each reference communication device estimates the time of arrival of the outbound ranging signals using signal curve fitting; and
said mobile communication device computes the range to each reference communication device using a timing adjustment determined from the signal curve fitting performed by each reference communication device on the outbound ranging signal corresponding to the selected reply ranging signal.

24. The system of claim 18, wherein said mobile communication device performs internal delay calibration to reduce errors in estimating a time of arrival of the reply ranging signal and computes the range to each reference communication device using a timing delay determined from the internal delay calibration.

25. The system of claim 24, wherein:
each reference communication device performs internal delay calibration to reduce errors in estimating a time of arrival of the outbound ranging signals; and
said mobile communication device computes the range to each reference communication device using a timing delay determined from the internal delay calibration performed by each reference communication device.

26. The system of claim 18, wherein:
said mobile communication device comprises a clock adapted to maintain a local timing reference, said mobile communication device determining a time of transmission of each outbound ranging signal and a time of arrival of each reply ranging signal in accordance with the local timing reference; and
each reference communication device comprises a clock adapted to maintain a local timing reference that is not synchronized with the local timing reference of the clock of said mobile communication device, each reference communication device determining a time of arrival of each outbound ranging signal and a time of transmission of each reply ranging signal in accordance with the local timing reference of the reference communication device.

27. The system of claim 26, wherein the clock of said mobile communication device and the clock of each of said reference communication devices are low accuracy clocks.

28. The system of claim 18, wherein said outbound ranging signals and said reply ranging signals are spread spectrum signals.

29. The system of claim 18, wherein each reference communication device is one of: a fixed communication device permanently mounted at a known position; and another mobile communication device.

30. The system of claim 29, wherein at least one of said reference communication devices is another mobile communication device.

31. The system of claim 18, wherein said mobile communication device is capable of varying which among a set of communication devices serve as said reference communication devices.

32. The system of claim 18, wherein:
said outbound ranging signals and said reply ranging signals include an acquisition portion; and
said mobile communication device and each reference communication device include a two-stage signal acquisition processor adapted to determine the time of arrival (TOA) of each reply ranging signal and each outbound ranging signal, respectively, said two-stage signal acquisition processor including a detection processor for detecting the acquisition portion and a TOA synchronization processor for accurately determining the time of arrival from the acquisition portion, said detection processor triggering operation of said TOA synchronization processor.

33. The system of claim 32, wherein the acquisition portion includes a communication acquisition sequence and a TOA synchronization sequence, wherein said detection processor operates on the communication acquisition sequence, and the TOA synchronization processor operates on the TOA synchronization sequence.

34. A method of determining the range between a mobile communication device and a reference communication device, comprising the steps of:
(a) transmitting a sequence of outbound ranging signals at different carrier frequencies from the mobile communication device to the reference communication device;
(b) transmitting a sequence of reply ranging signals at the different carrier frequencies from the reference communication device to the mobile communication device in response to the outbound ranging signals;
(c) Doppler compensating the reply ranging signals to reduce errors in estimating the time of arrival of the reply ranging signals; and
(d) determining the range between the mobile communication device and the reference communication device from a round-trip signal propagation time of a selected outbound ranging signal and a corresponding reply ranging signal transmitted at a carrier frequency providing a highest signal timing accuracy.

35. The method of claim 34, wherein steps (a), (b) and (c) are repeated with the mobile communication device and a plurality of reference communication devices, the method further comprising the step of:
(d) determining the position of the mobile communication device from known positions of the reference communication devices and the range to each reference communication device.

36. The method of claim 34, wherein step (c) includes:
(c1) determining a time of transmission of each outbound ranging signal and a time of arrival of each reply ranging signal in accordance with a local timing reference of the mobile communication device; and (c2) determining a time of arrival of each outbound ranging signal and a time of transmission of each reply ranging signal in accordance with a local timing reference of the reference communication device that is not synchronized with the local timing reference of the mobile communication device.

37. The method of claim 36, wherein the mobile communication device and the reference communication device maintain local timing references using low accuracy clocks.

38. The method of claim 34, wherein steps (a) and (b) including transmitting the outbound ranging signals and the reply ranging signals as spread spectrum signals.

39. The method of claim 34, further comprising the steps of:

(d) performing internal delay calibration to estimate internal transmitter and receiver timing delays in the mobile communication device and in the reference communication device, wherein step (c) includes using the estimated internal transmitter and receiver timing delays in the mobile communication device and in the reference communication device to determine the range.

40. The method of claim 34, wherein step (c) further includes:

(c1) determining a time of arrival of each reply ranging signal at said mobile communication device using a leading edge curve fit; and (c2) determining a time of arrival of each outbound ranging signal at each reference communication device using a leading edge curve fit.

41. The method of claim 34, wherein each reply ranging signal includes an acquisition portion, and step (c) further includes determining a time of arrival (TOA) of the reply ranging signal at the mobile communication unit using a two-stage process, including detection of the acquisition portion and TOA synchronization for accurately determining the time of arrival from the acquisition portion, wherein detection of the acquisition portion triggers TOA synchronization.

42. The method of claim 41, wherein the acquisition portion includes a communication acquisition sequence and a TOA synchronization sequence, wherein step (c) includes detecting the communication acquisition sequence and performing TOA synchronization on the TOA synchronization sequence.

43. A mobile communication device capable of determining range to a reference communication device by exchanging ranging signals with the reference communication device, comprising:

a transmitter configured to transmit to the reference communication device a sequence of outbound ranging signals at different carrier frequencies;

a receiver configured to receive from the reference communication device a sequence of reply ranging signals at the different carrier frequencies in response to the outbound ranging signals; and a processor configured to rotate a phase of each reply ranging signal to incremental phase angles over a range of phase angles and to select from among the reply ranging signals at each carrier frequency and incremental phase angle a reply ranging signal providing a highest signal timing accuracy, said processor determining a time of arrival of the selected reply ranging signal and the range to the reference communication device from a round-trip signal propagation time of the selected reply ranging signal and a corresponding outbound ranging signal.

* * * * *